United States Patent
Hiller et al.

[15] 3,682,923
[45] Aug. 8, 1972

[54] NICKEL COMPLEX OF THE DIOXIME OF 2-ACETOACETYLAMINO-6-ETHOXYBENZOTHIHZOLE

[72] Inventors: Heinrich Hiller, Mannheim; Peter Dimroth, Ludwigshafen, both of Germany

[73] Assignee: Badische Anilin-& Soda-Fabrik Aktiengesellschaft, Ludwigshafen, Rhine, Germany

[22] Filed: Sept. 10, 1969

[21] Appl. No.: 856,805

[30] Foreign Application Priority Data

Sept. 14, 1968 Germany..........P 17 94 150.3

[52] U.S. Cl.................260/299, 106/288 Q, 106/290, 260/41 B, 260/305
[51] Int. Cl. ......C07d 91/46, C07f 15/04, C09d 5/10
[58] Field of Search...........................260/299, 305

[56] References Cited

UNITED STATES PATENTS 2,093,214  9/1937  Schrader et al............260/305

OTHER PUBLICATIONS

Dave et al. (I), Current Science, Vol. 26, page 326 (1957)
Dave et al. (II), J. Indian Chem. Soc., Vol. 36, pp. 302–304 (1959)

Primary Examiner—Floyd D. Higel
Attorney—Johnston, Root, O'Keeffe, Keil, Thompson & Shurtleff

[57]  ABSTRACT

A nickel complex pigment dye having the formula:

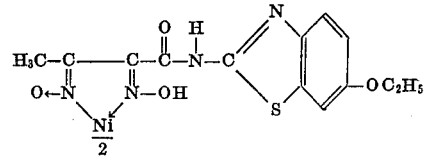

which is eminently suitable as a pigment, particularly for use in acrylic resin coating compositions, and which has excellent properties of light fastness and resistance to weather and overspraying.

1 Claim, No Drawings

NICKEL COMPLEX OF THE DIOXIME OF 2-ACETOACETYLAMINO-6-ETHOXYBENZOTHIHZOLE

Acrylic resin coating compositions in accordance with this invention contain, as essential constituents, polymers of acrylic esters or methacrylic esters, if desired with a melamine resin constituent and other components. Examples of the composition of such acrylic resin coating composition may be found for example in U.S. Pat. Specification No. 3,082,184. The acrylic resin coating compositions are used to a large extent for the production of metallic paints. These metallic paints contain, in addition to the pigment which imparts the color, fine metal particles in flake form, especially of aluminum, which by reflecting light provide the coatings with their special appearance. The result, however, of the reflected light produced by the metallic glitter is that particularly high demands are made on the light fastness of the pigment because reflection multiplies the destructive effect of light. Since metallic paints are used to a great extent for coating automobiles, weather resistance is also of great importance as well as light fastness.

The new pigment dye has generally very good fastness properties and fulfils all the requirements for use in metallic paints.

The pigment may be prepared by first nitrosating the compound having the formula:

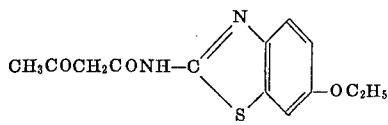

then oximating the product and metallizing with a nickel salt the dioxime obtained. Further details of a particularly advantageous method of preparation will be found in our U.S. Pat. Application Ser. No. 708,795 (now abandoned).

The invention is illustrated by the following Example. Parts and percentages in the following Example are by weight.

EXAMPLE (a) Preparation:

246 parts of 2-acetoacetylamino-6-ethoxybenzothiazole is slurried in a mixture of 398 parts of glacial acetic acid, 425 parts of 85 percent formic acid and 1,750 parts of water and the whole nitrosated with a solution of 80 parts of sodium nitrite in 306 parts of water at about 15° to 20° C. The whole is stirred for another 2 hours, 397 parts of isobutanol is poured in and the whole is heated to 65° to 75° C. Then 140 parts of hydroxylammonium sulfate and 110 parts of nickel sulfate heptahydrate are added, the temperature is raised to 85° to 90° C and the mixture is stirred for 3 hours. The product is suction filtered while hot, washed with hot water and dried. 240 parts of an orange pigment powder is obtained which may be brought into special forms by conventional methods, for example by salt milling, precipitation from sulfuric acid or treatment with solvents.

(b) Use in baking finishes:

95 parts of baking finish mixture consisting of 25 parts of butanol, 25 parts of xylene, 35 parts of acrylate resin (obtained from methyl methacrylate, butyl acrylate, butanediol monoacrylate, acrylic acid and styrene) and 10 parts of a melamine-formaldehyde resin is triturated in a cone mill with 5 parts of the pigment prepared as described under (a) — in the case of metallic paints, with a mixture of pigment and aluminum bronze. The orange coating agent thus obtained is baked for example onto an aluminum sheeting. It has excellent fastness to light, and excellent resistance to weather and overspraying.

We claim:

1. The dye having the formula:

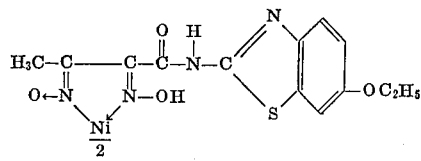

* * * * *